United States Patent [19]
Robison

[11] 3,939,863
[45] Feb. 24, 1976

[54] BASEMENT SUMP CONSTRUCTION
[75] Inventor: John Crosby Robison, Shawnee Hills, Ohio
[73] Assignee: Mildred M. Robison, Shawnee Hills, Ohio, Part interest
[22] Filed: July 10, 1974
[21] Appl. No.: 487,299

[52] U.S. Cl. .............. 137/357; 137/360; 137/527.8
[51] Int. Cl.² ................................. F16K 15/00
[58] Field of Search ...... 52/169; 137/356, 357, 360, 137/362, 527.6, 527.8

[56] References Cited
UNITED STATES PATENTS
468,141   2/1892   Tomlinson ....................... 137/360
1,104,806 7/1914   Kahn ............................... 137/360 X
2,093,515 9/1937   Filkins ............................ 137/360 X
3,809,119 5/1974   Cave .............................. 137/527.8

Primary Examiner—Henry T. Klinksiek
Attorney, Agent, or Firm—Palmer Fultz, Esquire

[57] ABSTRACT

A basement sump construction characterized by a sump chamber including a side wall provided with a drain outlet opening. A trap apparatus for the unidirectional flow of water is removably mounted on the sump side wall so as to be easily accessible to cleaning and servicing through a top access opening in the sump.

3 Claims, 3 Drawing Figures

BASEMENT SUMP CONSTRUCTION

BACKGROUND OF THE INVENTION

This invention relates generally to basement sump constructions and more particularly to a device of this character which is provided with a trap for the prevention of back flow of flood water.

PROBLEMS IN THE ART

In the construction of sumps for basements a problem has been present in the art in that back-flow preventing traps for flood prevention have always tended to clog and become inoperative so as to be useless at the time flooding conditions occur. Moreover, such prior trap constructions have generally been inaccessibly mounted in drain pipes beneath concrete slab floors whereby their cleaning or replacement has heretofore been extremely difficult and expensive.

SUMMARY OF THE INVENTION

In general, the present invention comprises a sump chamber provided with a top access opening and a sump side wall including a drain outlet opening. The latter is provided with a hinged trap assembly removably mounted on the sump side wall so as to be accessible by way of said access opening for cleaning or servicing.

As another aspect of the present invention the trap assembly is provided with a seal and gasket arrangements which are readily accessible and replaceable such that the leak preventing efficiency of the device can easily be maintained.

It is therefore an object of the present invention to provide a novel basement sump construction which includes a trap mechanism for the prevention of the back flow of flood water which mechanism is accessibly and removably mounted for cleaning and servicing.

Further object and advantages of the present invention will be apparent from the following description, reference being had to the accompanying drawings wherein a preferred form of embodiment of the invention is clealy shown.

DESCRIPTION OF THE PREFERRED EMBODIMENT

Figure 1:
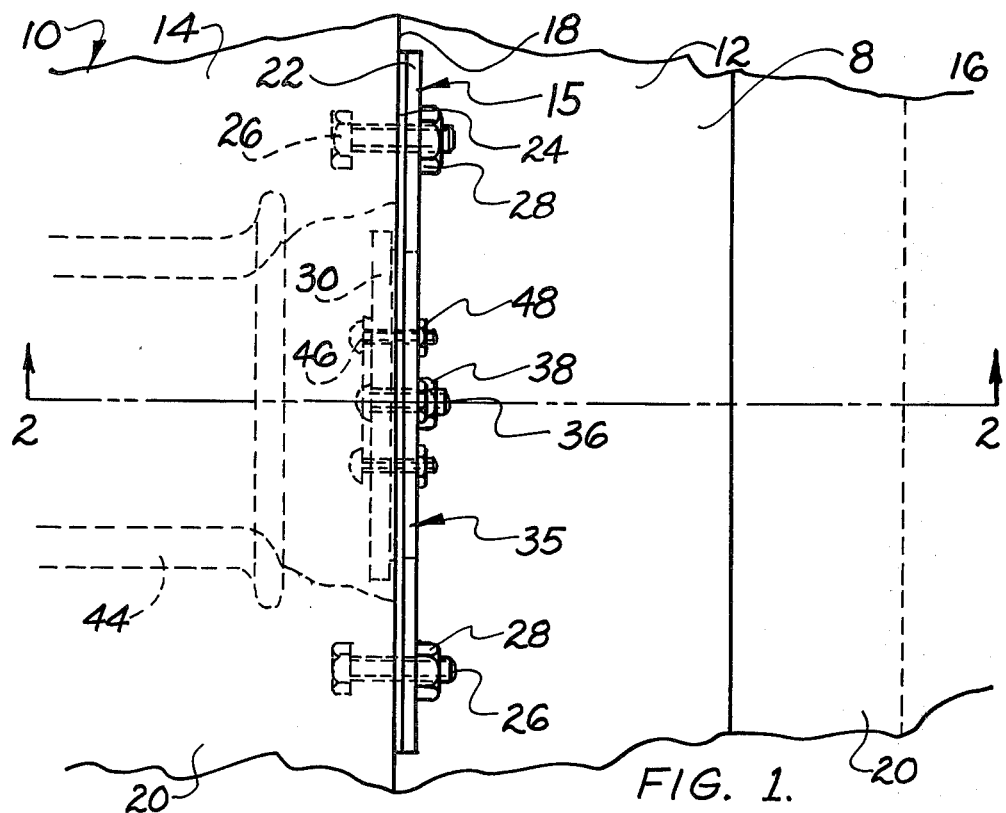
FIG. 1 is a partial top elevational view of a sump constructed in accordance with the present invention.
Figure 2:
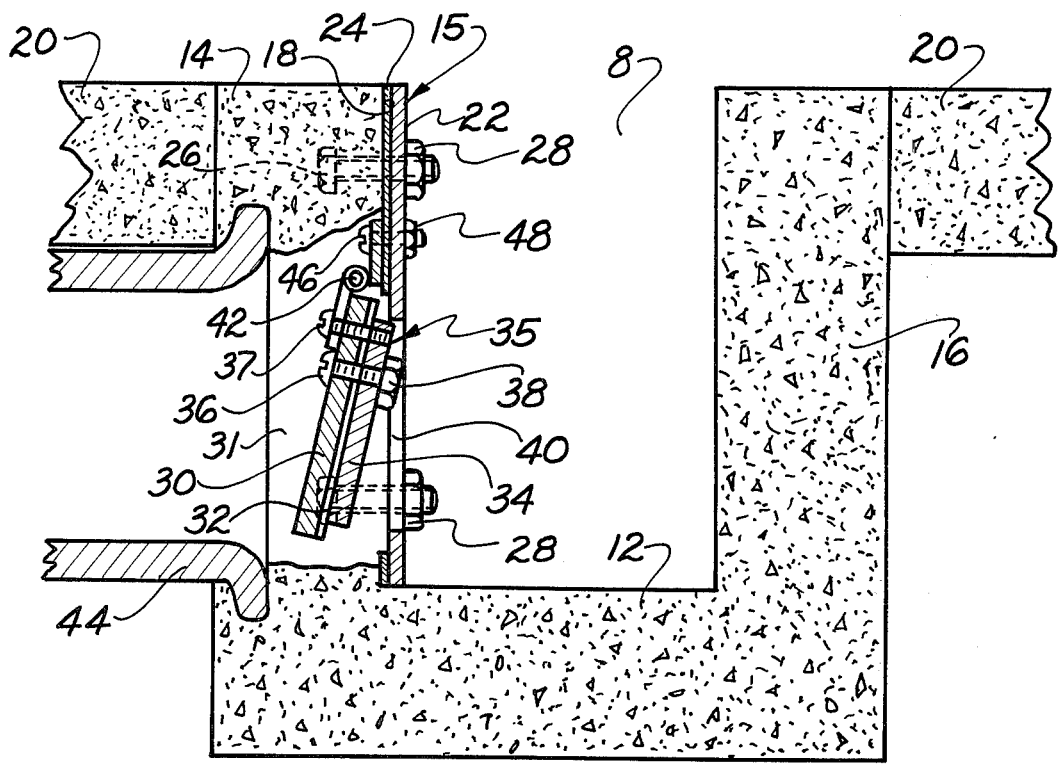
FIG. 2 is a side sectional view taken along line 2 — 2 of FIG. 1.
Figure 3:
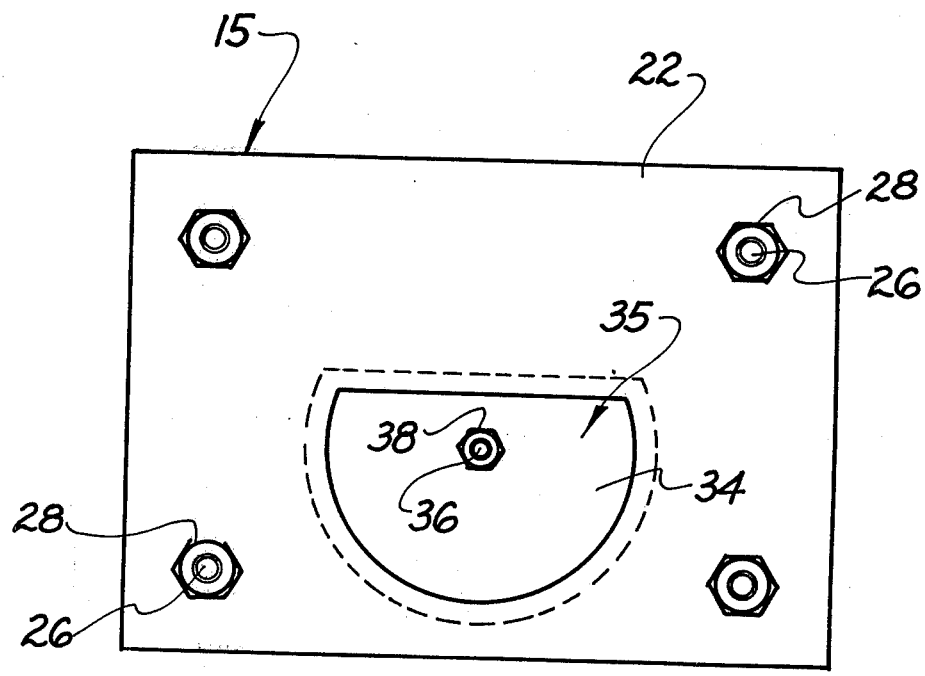
FIG. 3 is a front elevational view of the sump construction of the present invention.

Referring in detail to the drawings, FIG. 1 illustrates a basement sump constructed in accordance with the present invention which includes a sump chamber 8 formed by poured concrete side walls 14 and 16 and a bottom wall 12, said walls being positioned below a basement floor 20.

Side walls 14 includes a drain outlet opening 31 that communicates with a sewer tile 44 and such opening is provided with a removable trap assembly indicated generally at 15.

Such trap assembly 15 comprises a frame plate 22 including an outlet opening 40 with such plate being removably mounted on side wall surface 18 by bolts imbedded in the concrete and nuts 28.

A gasket or suitable sealing mastic 24 is disposed between frame plate 22 and side wall surface 18.

The trap mechanism further includes a door assembly indicated generally at 35 which consists of a main door plate 30 mounted to the outer surface of frame plate 22 by a hinge 42 with such hinge being secured to the frame plate by bolts and nuts 46 - 48 and to door plate 30 by cap screws 37.

Door assembly 35 is further provided with a flexible seal 32, formed of synthetic rubber or the like which is sandwiched between floor plate 30 and a seal retainer plate 34 with such plates being joined together by bolt and nut 36 - 38.

In operation, the sump is normally drained by water passing from chamber 8 to tile 44 since the trap door assembly 35 is free to open outwardly. When sump chamber 8 is empty the action of gravity will maintain door assembly 35 normally closed such that any flood water that may occur in the surrounding earth fill will exert pressure against the outer surface of the door and thereby urge it in a sealed closed position.

In the event that door assembly 35 should become clogged open it can readily be cleaned via the top opening of the sump chamber 8.

Moreover, the entire trap assembly 15 can be easily removed from the sump merely by loosening the nuts 28 whereby the assembly can be easily repaired or replaced.

While the form of embodiment of the present invention as herein disclosed constitutes a preferred form, it is to be understood that other forms might be adopted.

What is claimed is:

1. A basement sump construction comprising, in combination, a sump chamber including a top access opening, a sump side wall provided with an inner wall surface and a drain outlet opening; a trap frame plate mounted on said inner wall surface and including a plate side facing said drain outlet opening and a trap opening communicating with said drain outlet opening; a trap door pivotally mounted to said frame plate above said trap opening for unidirectional opening movement towards said drain outlet opening responsive to pressure exerted on said door when water is present in said sump chamber, said door being normally disposed in a closed position covering said trap opening; and mounting means accessible through said top access opening and removably securing said trap frame plate to said sump side wall.

2. The apparatus defined in claim 1 that includes a resilient seal between said trap door and said trap frame plate.

3. The apparatus defined in claim 1 that includes a gasket mounted between said trap frame plate and said sump side wall.

* * * * *